(No Model.)　　　　　　　　　　　　　2 Sheets—Sheet 1.
H. DANIELS.
LUMBER PILING MACHINE.
No. 500,861.　　　　　　　　　　Patented July 4, 1893.
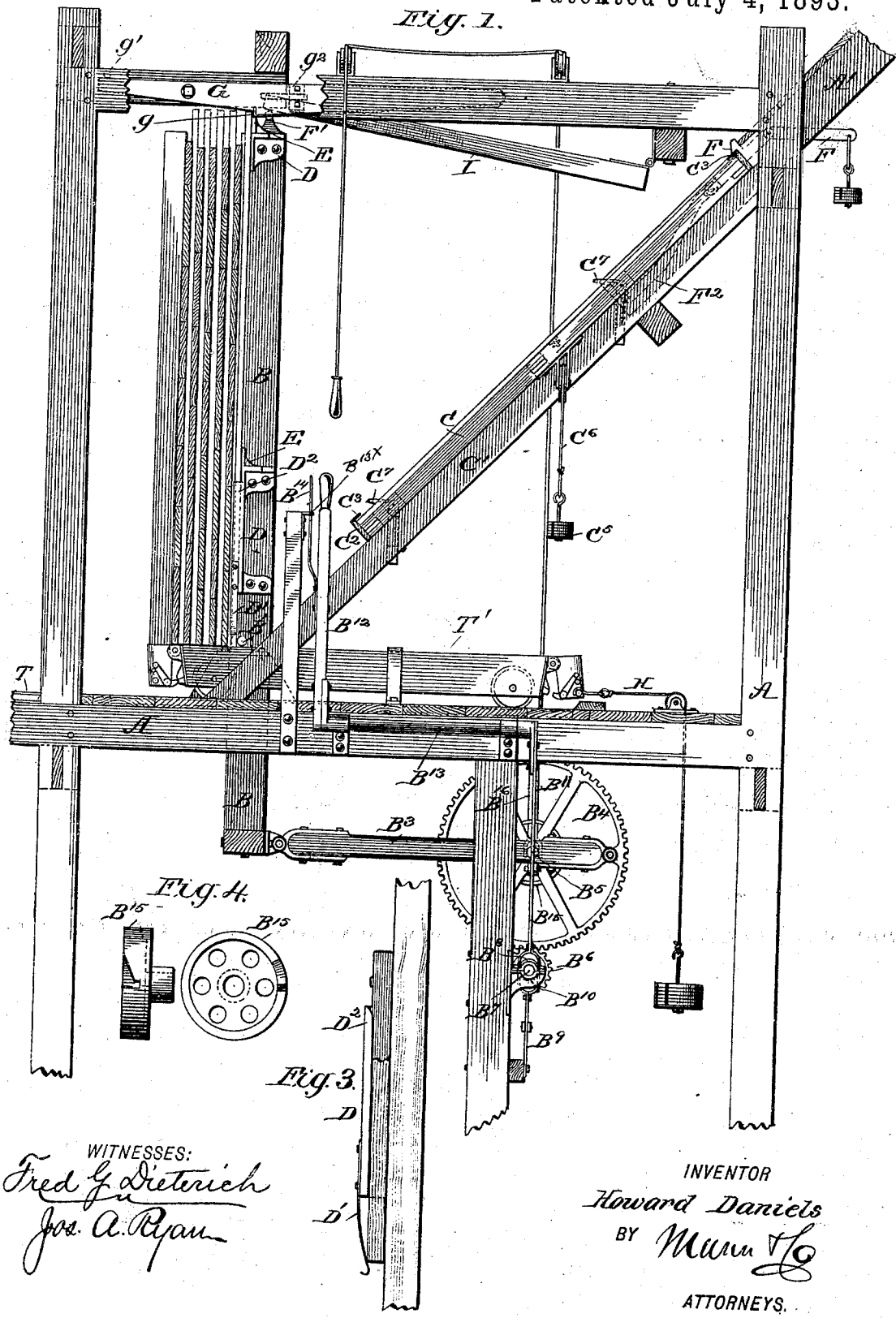
WITNESSES:
Fred G. Dieterich
Jos. A. Ryan
INVENTOR
Howard Daniels
BY Munn & Co
ATTORNEYS.

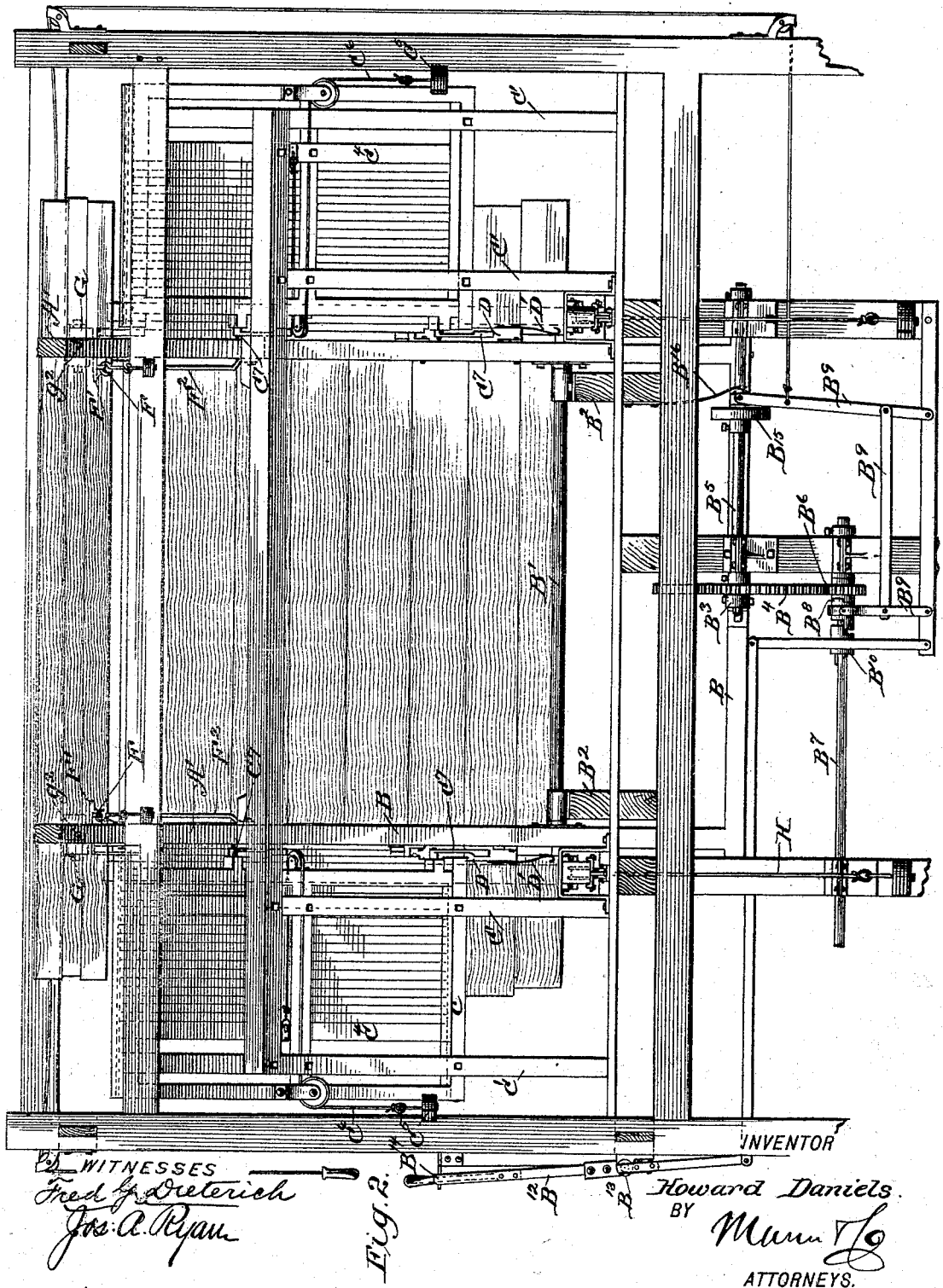

UNITED STATES PATENT OFFICE.

HOWARD DANIELS, OF ATLANTA, GEORGIA, ASSIGNOR OF ONE-HALF TO JAMES H. SIMONSON, OF FORT WAYNE, INDIANA.

LUMBER-PILING MACHINE.

SPECIFICATION forming part of Letters Patent No. 500,861, dated July 4, 1893.

Application filed December 21, 1892. Serial No. 455,938. (No model.)

*To all whom it may concern:*

Be it known that I, HOWARD DANIELS, residing at Atlanta, in the county of Fulton and State of Georgia, have invented certain new and useful Improvements in Lumber-Piling Machines, of which the following is a specification.

This invention is an improved lumber piling machine and has for its object to quickly and easily pile the lumber as it comes from the mill upon trucks preparatory to being transported to the drying kiln.

A further object of this invention is to provide a machine which will pile the lumber upon "edge" instead of laying it "flat" as ordinarily done; and a still further object is to automatically distribute the spacing strips or stakes between each course of lumber, whereby a series of vertical passages extending the entire height of the pile are produced through which the air circulates, for the purpose of drying the lumber.

With these objects in view my invention consists in the peculiar construction of the several parts and their novel combination and arrangement, all of which will be fully described hereinafter and pointed out in the claims.

In the drawings forming a part of this specification, Figure 1 is an end elevation of my improved lumber piling machine. Fig. 2 is a front elevation thereof. Fig. 3 is a detail view of a portion of the conveyer frame and rest plate, and Fig. 4 is a detail view of the cam wheel.

In carrying out my invention I employ a frame work A, carrying tracks T upon which run trucks T' to receive the lumber from the feed chute or slide A', through the medium of my machine as hereinafter described.

The truck used in connection with this machine is of novel construction and purpose, and forms the subject matter of a separate application filed of even date herewith.

B indicates a swinging frame adapted to convey the lumber from the feed chute to the piling truck, and is journaled upon a horizontal shaft B' supported upon the beams $B^2$, located at each side of the frame work A. The frame B projects below the floor of the frame A, and at its lower end is pivotally connected with a pitman $B^3$ which in turn is connected with a gear $B^4$ mounted upon a shaft $B^5$ journaled upon the supports of the frame work A. The gear $B^4$ is driven by means of a pinion $B^6$ loosely mounted upon a constantly rotating shaft $B^7$, the hub of which pinion $B^6$ is provided with jaws to engage with an ordinary clutch $B^8$, which has jaws on each end and which also turns loosely on the shaft $B^7$. The shaft $B^7$ is also provided with another ordinary clutch $B^{10}$ sliding upon a feather, and which is locked in or out of engagement with clutch $B^8$, by means of the levers $B^{11}$ and $B^{12}$, through the rock shaft $B^{13}$, and the quadrant $B^{13\times}$ and spring $B^{14}$. The object of this second clutch is to provide a way by which the action of the machine can be stopped at any moment in case of an accident, and also to prevent the swinging frame from coming down to its lowest position while the loaded trucks are being taken out and empty ones being put in when it is desirable to prevent it.

The clutch $B^8$ is operated by means of a compound lever $B^9$ under the control of the operator, who must necessarily stand in sight of the work; but it will be understood that the operator can only throw this clutch into engagement; it being thrown out of engagement automatically by means of a cam wheel $B^{15}$ and spring $B^{16}$. The cam wheel is mounted upon the shaft $B^5$, the purpose of which will be fully explained hereinafter.

The lumber comes directly from the mill or yard to the feed chute or slide A', and it will be observed that the boards are arranged edge to edge upon one another. The frame B is swung back from a vertical position to an inclined position in line with the feed chute A', whereby the timber held on said chute may be deposited upon the conveyer frame in such inclined position, and when the frame is swung forward to a vertical position the boards will be delivered upon the truck, edge upon edge instead of flat as ordinarily done, and in this manner I am enabled to pile more lumber upon one car than heretofore. It was also necessary before, to leave vertical passages between the flat courses of boards for the free circulation of air in drying, thus sacrificing a great deal of space; whereas, in my machine the boards are piled upon edge in vertical courses, and the spaces between each course formed by the spacing stakes provide ample passage for the circulation of air.

In my machine the spacing stakes are distributed automatically between each course, and in order to accomplish this I provide stake carrying frames C essentially rectangular in shape, supported rigidly in alignment with the feed chute A' by the timbers C'. The frame is formed with a lower cross piece or sill $C^2$ upon which the lower ends of the stakes rest, and upon the edge of such sill is secured a face plate $C^3$ to hold the stakes upon the sill. A similar plate and sill are secured at the upper end of the frame to hold the upper ends of the stakes in place.

The main frames C are located upon opposite sides, and each frame is provided with a follower $C^4$ which fits between the sills and face plate the same as a spacing stake. These followers are employed for the purpose of forcing the stakes inward from the frame, and are therefore connected with weights $C^5$ by means of cords $C^6$. To normally hold the stakes within the frame I pivot angular stops $C^7 C^7$ upon the outer faces of the side timbers of frame C, said stops being angular as shown whereby the weight of one member operates to hold the other member in the path of the end stake. The swinging conveyer frame B is constructed to swing between the stake holding frames C, and upon the outer faces of the side timbers of the frame B are secured rest plates D, D, at the top and bottom of same, in line with the sills $C^2$ of the stake carrying frames. The purpose of the rest plates is to support the stakes as they pass out from the stake frames to the conveyer frame. The rest plates D D are also adapted to press the stops $C^7$ back or down when the frame B is lowered by their projections E E, thus enabling the followers $C^4$ to force one stake inward from each frame C onto the rest plates, through the action of the weights $C^5$. As the conveyer frame B rises to deposit the course of boards the stakes slide downward on the rests until they strike the springs D' which hold them from going farther down until pressure is applied at the upper end of the stakes, which will be explained farther on. In sliding down to the springs D' they go between the timbers of the conveyer frame and a flange $D^2$, which is provided on the rest plate, which with the course of lumber on the conveyer frame makes sockets which prevent the stakes from dropping sidewise off the rest plates D.

F indicates catches upon the feed chute or slide which prevent any boards from dropping while the frame B is moving up to deposit a course upon the truck, and in order to trip such catches F when this frame B is lowered I provide tripping irons F' upon said frame, which engage the levers $F^2$ and press the catches F down, thereby allowing the boards to fall upon said frame; said tripping irons are also adapted to carry up the retarding timber I, the use of which will be explained farther on.

A rocking catch lever G is pivoted to the upper portion of frame work A and serves to hold the spacing stakes and course of lumber in place after the swinging frame has receded to receive another course of boards and spacing stakes. This lever G is inclined at its lower forward end, and is formed with a shoulder $g$ behind which the stakes are pressed by the frame B. The vibration of the lever G is limited by the pin $g'$ at one end and the stop $g^2$ at the other. The stop $g^2$ presses the stake through the spring D' down to the top of the trucks on which it is to stand. A weighted rope H is connected with the truck and serves to hold the load against the catch lever G, but permits the truck to move forward the requisite distance as each course is brought up and deposited.

Retarding timbers I are hinged to the upper part of the frame A to retard the lumber coming from the chute A', so that the course will not buckle up from the force of the lumber coming down. When the conveyer frame goes up with a course these timbers are carried out of the way by the tripping irons F' and as it comes back they let them down in place again.

In operation the stake frames C are loaded to their full capacity. The stops $C^7$ hold the stakes in place against the action of the follower $C^4$ and weights $C^5$. The catches F prevent any boards from descending, and the machine is now ready for operation. A truck is run beneath the shaft B' and end stakes attached to the same, against which the first course of lumber is to be laid. The weighted rope H is attached to the opposite end of truck for the purpose of regulating the tightness of the load, which is effected by increasing or decreasing the weight. The operator now works the lever $B^9$ by a rope, which lever throws the clutch $B^8$ into engagement with the clutch on the hub of the pinion $B^6$. The shaft $B^7$ being constantly rotated drives pinion, and consequently the gear wheel $B^4$ and pitman $B^3$. By this mechanism the frame B is swung back to an inclined position, and as it reaches its lowermost position—that is, in alignment with the feed chute A' and stake carrying frame C—this spring $B^{16}$ forces the lever $B^9$ into the notch in the rim of the cam wheel $B^{15}$ and automatically throws the clutch $B^8$ out of engagement. This leaves the conveyer frame stationary. The tripping irons F' have now tripped the catch F, allowing the boards which have collected on the chute to descend, upon the conveyer frame B, and at the same time the projections E, E, of the rest plates D D have pressed the stops $C^7 C^7$ down, allowing the followers $C^4$ to force the spacing stakes out against the side of the conveyer frame. As soon as a full course is collected the conveyer frame, with the course of boards and the spacing stakes, is ready to be lifted to a vertical position, and by operating the lever $B^9$ the machinery is again put in motion and the frame raised. As the frame B approaches a vertical position the upper ends of the stakes raise the forward end of the rocking catch lever G and as the frame continues upward, the stake is forced back of the shoulder $g$, and thus held in position, and the machinery continuing in motion returns the conveyer frame B to the inclined position and receives another course and the spacing stakes. At the same time the machinery is stopped and waits upon the operator. It will of course be understood that as soon as the frame B is moved upward the stops $C^7$ swing back and check the escape of any other stakes. As each course is put on the truck it is moved ahead a short distance, and when the last course is on, the conveyer frame is stopped in its descent by throwing clutch $B^{10}$ out of engagement. The end stakes are placed in position, the load run out, empty trucks prepared, and, clutch $B^{10}$ being thrown in, a new load is commenced.

Having thus described my invention, what I claim as new is—

1. In a lumber piling machine, the combination with a swinging conveyer frame, of a stake holding and distributing frame, substantially as described.

2. In a lumber piling machine, the combination with a truck of an intermittently swinging conveyer frame, and an inclined feed chute adapted to deliver the boards to the conveyer frame substantially as described.

3. In a lumber piling machine, the combination with an intermittently swinging conveyer frame, of a rocking catch lever adapted to hold the courses in position, substantially as shown and described.

4. In a lumber piling machine, the combination with a truck, of a weighted cord connected to one end of same, the swinging conveyer frame and the rocking catch lever, all arranged substantially as shown and described.

5. In a lumber piling machine, the combination with a feed chute having a stop catch at its lower end, adapted to hold the boards in check, of a swinging conveyer frame having tripping irons at its upper end adapted to operate and depress the catch stop substantially as shown and described.

6. In a lumber piling machine, the combination with a swinging conveyer frame carrying rest and tripping blocks, of the stake carrying frame, having stops to hold the stakes, the tripping blocks being adapted to operate said stops substantially as shown and described.

7. In a lumber piling machine, the combination with the stake holding frame, comprising the followers and pivoted stops, of the swinging conveyer frame, comprising rest and tripping blocks, and the rocking catch lever, all arranged substantially as shown and described.

8. In a lumber piling machine, the combination with a swinging frame, of a feed chute, the pitman and gear for operating the frame, the cam wheel on shaft with gear, the intermittent pinion, clutch and lever, said lever being adapted to be operated by the cam wheel to throw the clutch out of engagement, substantially as shown and described.

9. In a lumber piling machine, the combination with a truck, of the swinging conveyer frame, mounted upon a horizontal shaft and driven intermittently by means of pitman, gear and intermittent pinion, the rest plates, tripping blocks and tripping irons upon said conveyer frame, the stake carrying frame upon the same shaft comprising the followers and pivoted stops the feed chute and catch stops, and the rocking catch lever all arranged substantially as shown and described.

10. In a stake holding frame, the combination of the side members and upper and lower sills, the face plates secured to the sills, the follower having weighted cords attached thereto, and the pivoted angular stops upon the outer sides of the frame substantially as shown and described.

11. In a lumber piling machine, the combination of the swinging frame and stake holding and distributing frame, the truck, rocking catch lever, and the stops arranged above and below said lever to limit its movement substantially as shown and described.

HOWARD DANIELS.

Witnesses:
J. H. GROVES,
S. L. JEFFERSON.